United States Patent [19]

Schawann et al.

[11] Patent Number: 4,593,937
[45] Date of Patent: Jun. 10, 1986

[54] DEVICE FOR CONNECTING AND DISCONNECTING A TUBULAR PIPE MOVABLE INSIDE A FIXED TUBULAR PIPE

[75] Inventors: Jean C. Schawann, Idron; Jean P. Caumont, Pau; Jean Falcimaigne, Bois Colombes, all of France

[73] Assignee: Societe Nationale Elf Aquitaine, Paris, France

[21] Appl. No.: 651,218

[22] Filed: Sep. 14, 1984

[30] Foreign Application Priority Data

Sep. 15, 1983 [FR] France .................. 83 14664

[51] Int. Cl.⁴ ............................... F16L 37/16
[52] U.S. Cl. ........................ 285/18; 285/33; 285/315; 285/143; 285/920; 166/339; 166/344
[58] Field of Search ............... 285/18, 33, 315, 320, 285/141, 142, 143, DIG. 21, DIG. 23, 307; 166/339, 344

[56] References Cited

U.S. PATENT DOCUMENTS

| | | | |
|---|---|---|---|
| 2,962,096 | 11/1960 | Knox | 285/18 |
| 3,163,222 | 12/1964 | Foster | 285/18 |
| 3,325,190 | 6/1967 | Eckert | 285/18 |
| 3,333,870 | 8/1967 | Watkins | 285/18 |
| 3,488,031 | 1/1970 | Bezner | 285/18 |
| 3,510,153 | 5/1970 | Newton | 285/18 |
| 3,554,579 | 1/1971 | Brown | 285/18 |
| 4,012,059 | 3/1977 | Luke et al. | 285/18 |
| 4,076,278 | 2/1978 | Chateau | 285/18 |
| 4,080,868 | 3/1978 | Matthews | 285/18 |
| 4,453,745 | 6/1984 | Nelson | 285/18 |

FOREIGN PATENT DOCUMENTS

| | | | |
|---|---|---|---|
| 1597323 | 7/1970 | France. | |
| 311083 | 8/1971 | U.S.S.R. | 285/18 |

Primary Examiner—Cornelius J. Husar
Assistant Examiner—Eric K. Nicholson
Attorney, Agent, or Firm—Poms, Smith, Lande & Rose

[57] ABSTRACT

A device for connecting and disconnecting a first tubular conduit mobile in longitudinal translation inside a second fixed tubular conduit of the type comprising a longitudinally sliding mobile piece and which, for locking, bearing by an inclined bearing surface on a bearing surface of a mobile detent, causes said detent to swing through an opening formed in the wall of the fixed conduit into a groove formed in said mobile conduit. The means for driving the sleeve comprise a finger projecting through an aperture formed in the wall of said fixed conduit and sliding in a housing formed in the thickness of this conduit, for locking, under the effect of the thrust exerted by the downward movement of said mobile conduit onto said finger by means of a shoulder with which said mobile conduit is provided and, for unlocking, by sliding in the reverse direction under the effect of hydraulic or mechanical means such as a rod. Mechanical anchorage, separate from the hydraulic connection, is effected by simply driving in said mobile conduit.

10 Claims, 3 Drawing Figures

DEVICE FOR CONNECTING AND DISCONNECTING A TUBULAR PIPE MOVABLE INSIDE A FIXED TUBULAR PIPE

BACKGROUND OF THE INVENTION

The present invention relates to a mechanical connection device for connecting a tubular pipe by means of a mechanical connector fixed to a horizontal plate pierced with an orifice in the axis of the connector and more especially to a device for connecting and disconnecting peripheral tubes on an underwater production riser base.

For deep sea production equipment the problem which frequently arises is that of rapid and reliable connection and disconnection of a pipe string coupled to a well head forming part of the equipment of an underwater station.

In precarious sea conditions or if the mooring line of the floating structure to which the column is suspended has been lost, the pipe strings must be rapidly disconnected, then reconnected when the conditions have improved.

Hydraulic connection devices are known actuated from the surface by means of hydraulic cylinders which for example push a conical ring which in its turn exerts a thrust releasing the string end from its connector.

SUMMARY OF THE INVENTION

The present invention provides a device in which the sealing function is provided separately from the mechanical anchoring function, for example by driving a male endpiece with O-seals carried by a string and into a female receptacle with which the well head is provided. The mechanical connection of the invention is formed by an annular connector fixed to a horizontal plate and acting on an end tube of the peripheral tube.

In its more general sense, the invention relates to a device for connecting and disconnecting a first tubular conduit movable in longitudinal translation inside a second fixed tubular conduit of the type comprising a longitudinally sliding sleeve and which, for locking, bearing by means of an inclined bearing surface on a bearing surface of at least one mobile detent, causes said detent to penetrate through an opening which the wall of this second fixed tubular conduit comprises, into a groove formed in the mobile tubular conduit, wherein the drive means for causing said sleeve to slide longitudinally comprise at least one radial finger projecting through an aperture formed in the wall of said fixed tubular conduit and sliding in a housing formed in the thickness of this conduit, during locking, under the effect of the thrust exerted by the descent of the first mobile tubular conduit on said finger by means of a shoulder due to the change of diameter and with which said mobile conduit is provided and, during unlocking, by reverse direction sliding under the effect of hydraulic or mechanical means.

In an advantageous embodiment, the mobile tubular conduit has, over a height H, a section of diameter D reducing to a section $D' < D$ so as to form an annular shoulder in the passage zone between the sections, serving as means for driving the finger and the height H extending from the groove of diameter $D''$ as far as the annular shoulder is calculated so that when, under the effect of the thrust exerted, the finger comes into abutment at the end of travel in the aperture against the edge of said aperture, the mobile detent may swing inwardly and penetrate into the housing formed by the groove of diameter $D''$ of the mobile conduit. The mobile detents may be held in the unlocked position by means of a resilient return means.

The housing for the sleeve formed in the thickness of the fixed conduit may comprise an annular chamber having a hydraulic fluid intake, in which is slidingly disposed a shoulder integral with said mobile sleeve and serving as a cylinder piston for maintaining blocking. The mechanical unlocking means may be formed by a rod fixed to the end of the sleeve passing through the wall of the housing through an orifice and extending to a manually accessible position. The hydraulic unlocking means may be formed by an annular chamber housing an annular piston, one hydraulic fluid intake opening below and another above said piston so as to be able to apply the hydraulic pressure to one or other face of the piston.

BRIEF DESCRIPTION OF THE DRAWINGS

Other features of the invention will be clear from the embodiment described hereafter by way of example, for which the case has been chosen of a device for mechanical connection of a peripheral tube of a production riser passing through an orifice pierced in a horizontal connector carrying plate integral with a central tube of a production riser to a well head of an underwater station.

In the accompanying drawings

DESCRIPTION OF THE PREFERRED EMBODIMENT

Figure 1:
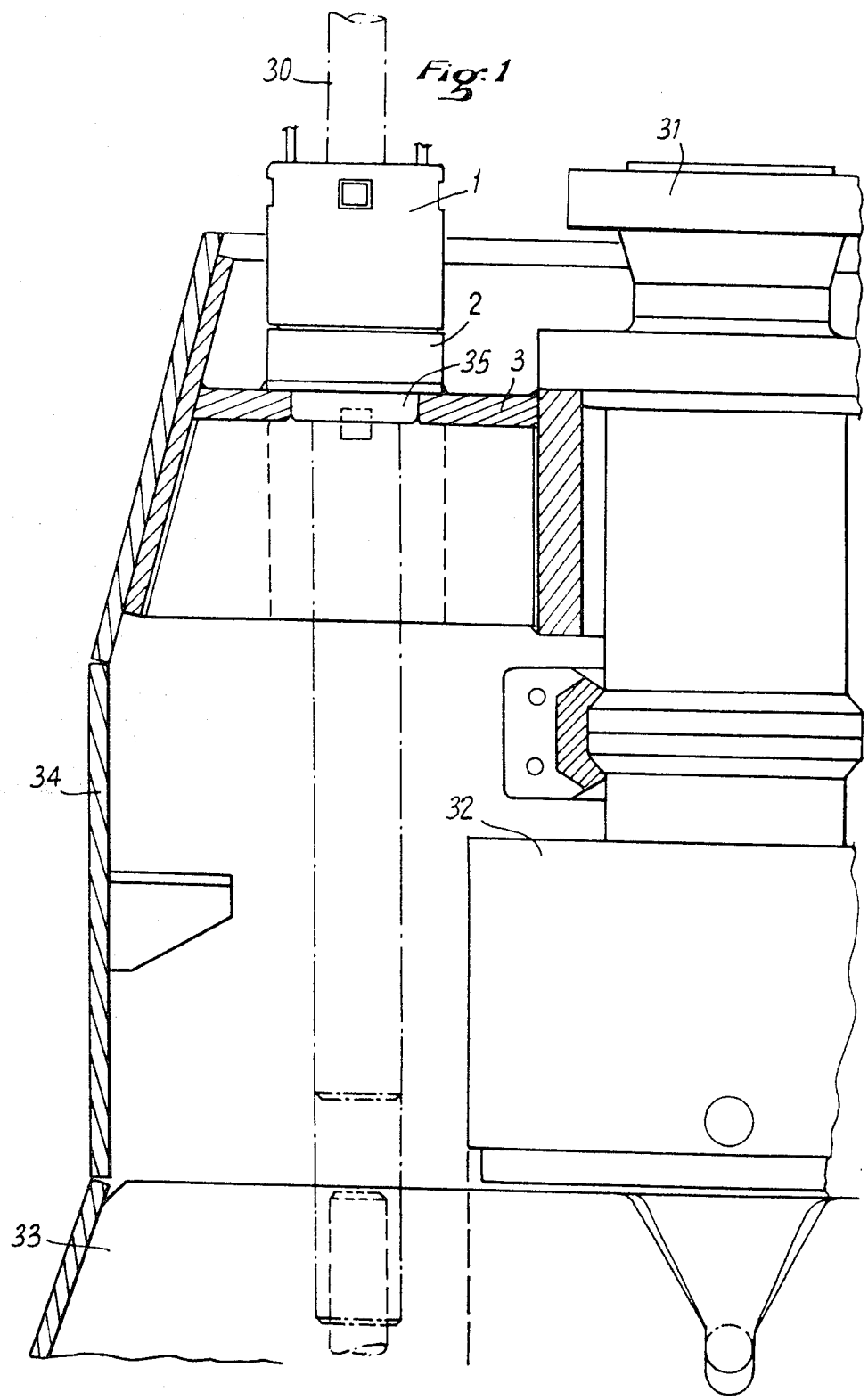
FIG. 1 shows a vertical half section illustrating schematically the emplacement of the connector with respect to the central tube.

The elements of a production riser shown in FIG. 1 comprises a central tube 31 having a connector 32 connected in a usual way to a receptacle of a well head 33 of an underwater station. The guide funnel 34, having served for finding the emplacement of the well head, is carried during its descent by a horizontal plate 3 fixed by means of a sleeve to the central tube 31 and it is pierced with an orifice 35 for passing the peripheral string 30 therethrough. To orifice 35 is welded support 2 to which a connector assembly 1 is fixed by a bayonet system. This assembly comprises a frame 4 formed of several parts assembled together by bolts and comprises an annular housing, defined inwardly in its lower part by a sleeve 23 integral with frame 4. This sleeve is pierced with a plurality of concentrically disposed apertures 8. Its upper face forms an annular bushing with cylindrical bearing surface 9. Above sleeve 23 is disposed an annular opening 7, the purpose of which will be explained hereafter.

In the annular housing of frame 4 is disposed, for axial sliding, a mobile annular piece 5. This piece comprises, from top to bottom, a truncated cone shaped bearing surface 5b widening out towards the outside, an annular part 5a and a part 5c carrying a locking finger 6 projecting with respect to the inner diameter of the annular frame 4.

An assembly of locking dogs which, in this example is formed by eight small plates or blocks 10 in the form of ring sectors resting on the cylindrical bearing surface 9 and capable of swinging inwardly about their axes 22, is inserted in the upper opening 7 of the annular housing of frame 4.

Each plate 10 has on its outer edge an inclined face 10a serving as bearing surface for face 5b of the mobile piece 5. Its elongate form corresponds to the height of the annular opening 7 of the housing and has, on its edge turned towards this opening, a projecting boss 10b having an upper chamfer and a lower edge. A resilient guard or keeper ring 11 holds the plates 10 together and in a radially outwardly retracted position with respect to opening 7.

Aperture 8 has an axial length corresponding to the vertical travel of finger 6, which projects with respect to aperture 8. At the end of travel, it comes into abutment against the lower edge of the aperture.

On the opposite side to finger 6, part 5c has an annular shoulder 5d able to slide in an annular chamber 20 formed in the wall of the annular housing of frame 4 and comprising a hydraulic fluid intake 21. Chamber 20 contains, below shoulder 5d, an annular piston 12, one hydraulic fluid intake 13 opening below and another 14 opening above said piston 12, so as to be able normally to apply a hydraulic pressure to one or other face of piston 12. The annular housing of frame 4 is adapted so as to allow axial sliding of the upper end 15 carrying a truncated cone shaped bearing surface 5b and lower end 16 of the mobile piece 5. To the upper end 15 of the mobile piece 5 are fixed one or more rods 19 which extend outside the frame by passing through orifices provided for this purpose.

The peripheral tube 30 of external diameter D has at its lower part a diameter D' less than D, so that in the transition zone between the section of diameter D and the section of diameter D' is formed an annular bearing surface in the form of a sharp edge 17 serving as mobile stop and driving finger 6 in translation.

Above edge 17, at a distance H the tube has a groove 18 of diameter D". This groove is placed, during the descent of the mobile piece 5, at the height of plates 10 of the locking dog, so as to allow the bosses 10b pushed by the truncated cone shaped bearing surfaces 5b to swing inside the groove, the upper boss chamfer being positioned at the end of travel in the upper end of groove 18.

Figure 2:
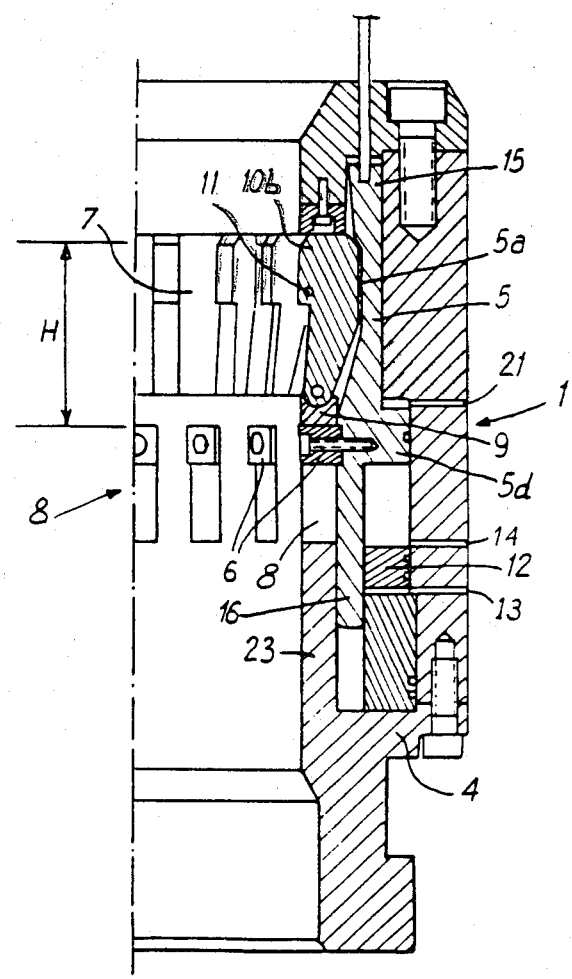
FIGS. 2 and 3 show axial sections of the connector of the invention, respectively of the connector available for receiving the tubular conduit and of the connector and its conduit in the connected position.
Figure 3:
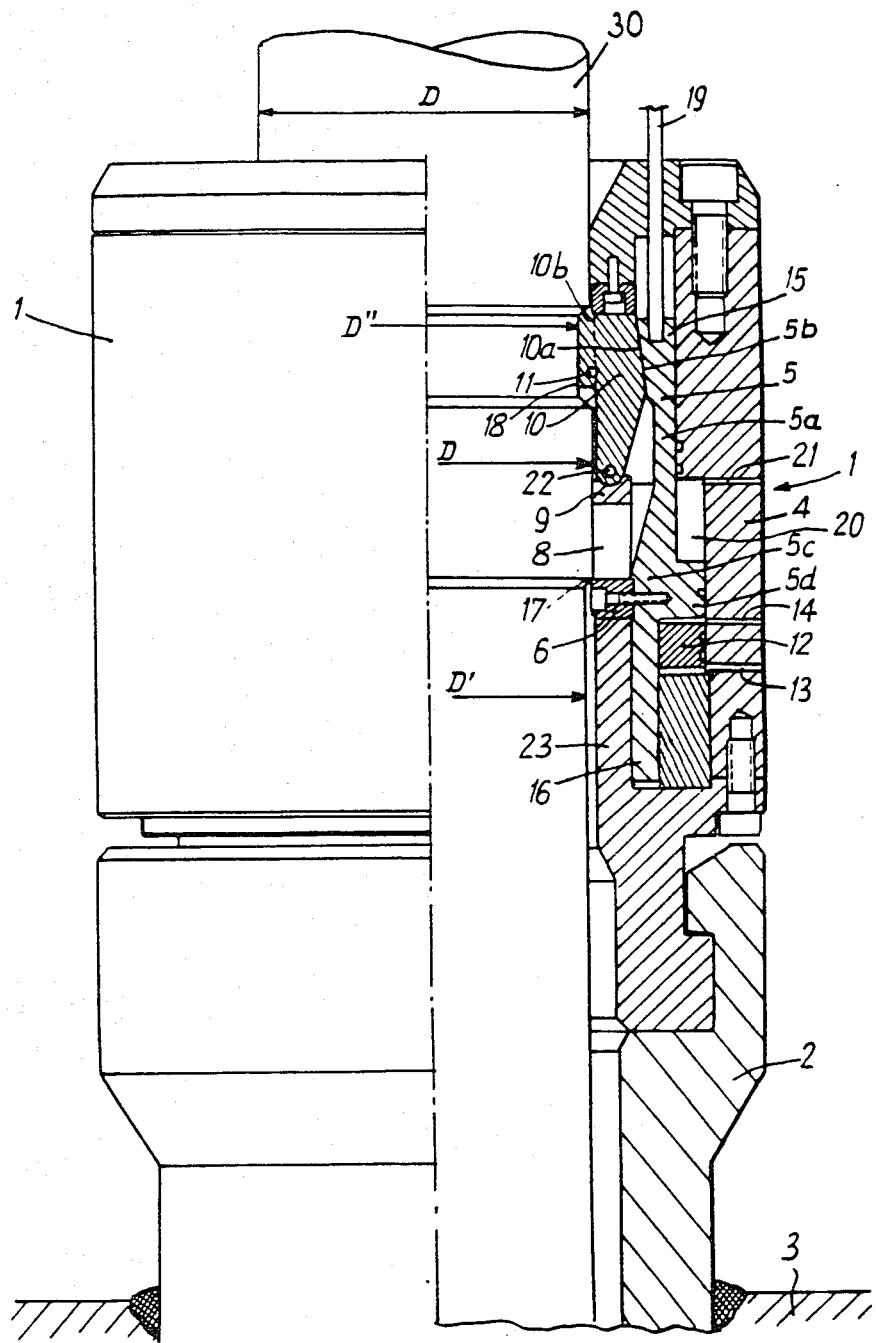

In operation, when it is a question of connecting the peripheral string 30 to connector 1, this latter is in the position shown in FIG. 2. The mobile piece 5 has ascended again and finger 6 is in abutment against the swinging seat 9 of the locking dog, whereas keeper ring 11 holds plates 10 together so that bosses 10b do not project inwardly.

During the descent of string 30, the sharp edge 17 meets the locking finger 6 and drives it over a distance H calculated so that in its downward travel, the finger 6 integral with the mobile piece 5 being in abutment against the lower edge of aperture 8, the plates 10 are situated opposite groove 18, swing about their axes 22 and penetrate into groove 18 and lock the connection. To improve the locking, pressurized hydraulic fluid is fed at 21 exerting a thrust on shoulder 5d. Locking is thus held by hydraulic pressure.

During unlocking, the direction of pressurization is reversed by feeding hydraulic fluid either at 13 or 14. This alternative provides a guarantee against breakdowns of the hydraulic circuits and contributes to the reliability of operation.

Should these circuits breakdown, there remains the possibility of using an underwater device equipped with a special tool which approaches the mechanical unlocking rod 19 and pulls it.

Either during the action of hydraulic circuits 13 and 14, or by pulling rod 19, the mobile piece 5 is again raised, finger 6 exerting an upward thrust on tube 30 through the edge 17. With the lower chamfer of boss 10b being shaped so as to move plates 10 away during passage of groove 18, the peripheral string 30 is freed from the connector and it may be pulled from the surface. With the bayonet fitting system of connector 1 to support 2, the special device may, by rotating the connector, remove it for possible replacement.

With the device of the invention, several results may be attained. The mechanical anchorage function is separated from the hydraulic connection function. This mechanical anchorage is provided by simply driving in the peripheral tube, whereas locking is guaranteed by action of the holding hydraulic pressure. Unlocking is provided by reverse pressurization of the annular piston by means either of the main hydraulic fluid intake 14 or emergency fluid intake 13. Also, the unlocking may be provided by a mechanical traction exerted on the rod by means of a special tool carried by an underwater device. Removal of the connector, fixed by a bayonet system to a support may be effected by using the same special tool. All these results contribute to making operation of the device reliable, rapid and particularly well adapted to deep sea working.

What is claimed is:

1. A device for connecting and disconnecting a first tubular conduit movable in longitudinal translation inside a second fixed tubular conduit of the type comprising a mobile piece in the form of a longitudinally sliding sleeve and which, for locking, by bearing with an inclined bearing surface of at least one mobile detent, causes said detent to swing through an opening formed in a wall of this second tubular conduit into a groove formed in said mobile tubular conduit, wherein the drive means for causing longitudinal sliding of said sleeve comprise at least one radial finger projecting through an aperture formed in said wall of said fixed tubular conduit and sliding in a housing formed in the thickness of said wall of the fixed conduit, during locking, under the effect of the thrust exerted by the downward movement of said first mobile tubular conduit onto said finger by means of a shoulder due to the change of diameter and with which said mobile conduit is provided and, during unlocking, by sliding in the opposite direction under the effect of hydraulic or mechanical means.

2. The device as claimed in claim 1, wherein said mobile tubular conduit has, over a height H, a section of diameter D passing into a section of diameter D'<D, so as to form an annular shoulder in the transition zone between the two sections serving as drive means for the finger and in that the height H extending from the groove of diameter D" as far as the annular shoulder is calculated so that when, under the effect of the thrust exerted, the finger abuts at the end of travel in the aperture against the edge of said aperture, the mobile detent may swing inwardly and penetrate into the housing formed by the groove of diameter D" of said mobile conduit.

3. The device as claimed in claim 1 wherein said detents movable in direction of said opening are provided with a resilient means for return to the unlocked position.

4. The device as claimed in claim 1 wherein said fixed tubular conduit comprises in its thickness an annular frame enclosing an annular housing in which said mobile piece or sleeve is disposed for axial sliding, said annular frame is defined inwardly in its lower part by a sleeve integral with said frame, having a plurality of apertures and whose upper face forms an annular bushing with cylindrical bearing surface, on which rest said mobile detents able to swing inwardly about their axes.

5. The device as claimed in claim 1
wherein above said sleeve, there is disposed in the inner face of said frame an annular opening whose height corresponds to the height of said mobile detents.

6. The device as claimed in claim 1, wherein the housing for the sleeve formed in the thickness of said fixed conduit has an annular chamber with a hydraulic fluid intake in which is slidingly disposed a shoulder integral with said mobile sleeve and serving as cylinder piston for locking maintenance.

7. The device as claimed in claim 1, wherein said mechanical unlocking means are formed by a rod fixed to the end of said sleeve passing through the wall of the housing through an orifice and extending as far as a manually accessible position.

8. The device as claimed in claim 1, wherein said hydraulic unlocking means are formed by an annular chamber housing an annular piston, one hydraulic fluid intake opening below and another above said piston, so as to be able to apply the hydraulic pressure to one or other face of the piston.

9. The device as claimed in claim 1 for connecting and disconnecting a production line or pipe string to an underwater installation, wherein said first tubular conduit is formed by said pipe string and said fixed tubular conduit is formed by an annular frame of a connector fixed to a horizontal plate integral with the underwater installation and through which the pipe string passes so as to reach the end piece of the bottom string.

10. A device for connecting and disconnecting a first tubular conduit movable in longitudinal translation inside a second fixed tubular conduit comprising in combination:

said fixed tubular conduit having an internal housing provided with an interior opening and a longitudinally extending aperture below said opening;

a mobile detent pivotally mounted on said fixed conduit adjacent said interior opening to swing into said opening;

resilient means for said detent urging said detent into radially outwardly retracted position with respect to said interior opening;

a sleeve member longitudinally slidable in said housing;

a radially extending finger on said sleeve member projecting through said aperture;

a shoulder on said movable conduit for engaging said finger and moving said sleeve member downwardly in said housing;

said movable detent and said sleeve member having engageable surfaces for moving said movable detent radially inwardly for engagement with said movable conduit;

and fluid means for maintenance of said movable detent and sleeve member in locked position and for moving said sleeve member into unlocked position.

* * * * *

UNITED STATES PATENT AND TRADEMARK OFFICE
CERTIFICATE OF CORRECTION

PATENT NO. : 4,593,937
DATED : June 10, 1986
INVENTOR(S) : Jean C. Schawann, et al.

It is certified that error appears in the above-identified patent and that said Letters Patent are hereby corrected as shown below:

Change the name of the assignee on the face of the United States Letters Patent from Societe Nationale Elf Aquitaine to Societe Nationale Elf Aquitaine (Production).

Signed and Sealed this

Fourteenth Day of October, 1986

[SEAL]

Attest:

DONALD J. QUIGG

*Attesting Officer*    *Commissioner of Patents and Trademarks*